United States Patent
Foss et al.

(10) Patent No.: US 10,293,668 B1
(45) Date of Patent: May 21, 2019

(54) WATER MANAGEMENT SYSTEMS FOR VEHICLE SUNROOF ASSEMBLIES

(71) Applicant: GM Global Technology Operations LLC, Detroit, MI (US)

(72) Inventors: John Foss, Troy, MI (US); David T. Renke, Macomb, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/839,324

(22) Filed: Dec. 12, 2017

(51) Int. Cl.
 *B60J 3/02* (2006.01)
 *B60J 7/00* (2006.01)

(52) U.S. Cl.
 CPC ........... *B60J 7/0015* (2013.01); *B60J 7/0084* (2013.01)

(58) Field of Classification Search
 CPC ........ B60J 7/0084; B60J 7/0015; B60J 7/003; B60J 7/0038
 USPC .................................................. 296/213, 214
 See application file for complete search history.

(56) References Cited

U.S. PATENT DOCUMENTS

| 4,159,144 | A | 6/1979 | Ehlen et al. |
| 4,892,351 | A | 1/1990 | Ono et al. |
| 5,149,170 | A * | 9/1992 | Matsubara ............... B60J 7/003 296/213 |
| 7,905,542 | B2 * | 3/2011 | Marx ..................... B60J 7/0084 296/213 |
| 8,926,004 | B2 | 1/2015 | Betzen et al. |
| 9,290,084 | B2 | 3/2016 | Bojanowski et al. |
| 9,340,096 | B2 | 5/2016 | Bojanowski |

\* cited by examiner

*Primary Examiner* — Dennis H Pedder
(74) *Attorney, Agent, or Firm* — Quinn IP Law

(57) ABSTRACT

Disclosed are vehicle sunroof assemblies with enhanced water management systems, methods for making/using such sunroof assemblies, and vehicles equipped with sunroof assemblies having sunshade water drainage backup capabilities. A representative sunroof assembly includes a frame that attaches to the body of a motor vehicle, positioned within an aperture in the vehicle's roof structure. A center panel is movably mounted to the frame, and operable to transition between open and closed positions to thereby obstruct and expose the aperture. Also attached to the frame is a drain channel that collects and expels fluids from the sunroof assembly. A sunshade is movably mounted to the frame adjacent the center panel. The sunshade manually or automatically transitions between deployed and stowed positions to thereby prevent and allow the passage of light through the roof's aperture. When in the deployed position, the sunshade repels water and directs the repelled water into the drain channel.

20 Claims, 3 Drawing Sheets

WATER MANAGEMENT SYSTEMS FOR VEHICLE SUNROOF ASSEMBLIES

INTRODUCTION

The present disclosure relates generally to compartment closure assemblies for motor vehicles. More specifically, aspects of this disclosure relate to water management systems for sunroof assemblies of motor vehicles.

Most current production motor vehicles, such as the modern-day automobile, are originally equipped with various compartment closure assemblies, namely passenger doors, trunk lids, engine hoods, etc., that are movably mounted to the vehicle body to provide access to the vehicle's various compartments. Some automobiles offer as original or optional equipment a sunroof assembly that is installed within the vehicle roof, e.g., to provide extra sunlight and ventilation for an interior passenger compartment. Vehicle sunroofs may be typified by a motor-driven or manually operated glass pane that slides or pivots to selectively uncover an opening in the roof panel above the passenger compartment. Automotive sunroofs come in many styles, including pop-up designs, slidable varieties, folding configurations, T-top architectures, and panoramic assemblies. To install a sliding sunroof—whether a top load, bottom load, or inbuilt architecture—guide rails are mounted on port and starboard sides of the roof opening, and lateral sides of the glass pane are mated with these guide rails. The perimeter of the sunroof frame may be equipped with a trough that collects and feeds water runoff to one or more bleed nozzles that cooperatively drain water from the frame. Drain hoses may be coupled to the nozzles and fed through structural body pillars to evacuate water from the vehicle.

SUMMARY

Disclosed herein are vehicle sunroof assemblies with enhanced water management systems, methods for making and methods for using such sunroof assemblies, and motor vehicles equipped with a sunroof assembly having a sunshade water drainage backup system. By way of example, there is presented a sunroof water management system that prevents or otherwise mitigates incidental water ingress while the sunroof window is open and the sunshade is drawn closed. The top surface of the sunshade is coated with a suitable hydrophobic or comparably water-repellant treatment. When deployed, the sunshade may take on a convex, pointed, or similar shape designed to direct water runoff to the outer periphery of the sunshade. The sunshade is mounted along the uppermost extent of the sunroof's water trough(s) so as to allow water to naturally flow off the fore, aft and/or lateral edges of the sunshade, e.g., under the force of gravity, into the troughs. An optional pull cup, which is mounted to the leading edge of the sunshade, is fabricated with a drain passage for directing water runoff to the drainage trough. As yet another option, a fluid dam is placed along the trailing edge of the sunshade to guide water runoff, e.g., in one or both transverse directions, into the troughs. Disclosed sunroof water management systems help to repel water and manage accompanying runoff to avoid water entry into the vehicle's interior when the sunroof is left open. This, in turn, will help to reduce warranty claims for interior vehicle water damage caused by water ingress through the sunroof. Another attendant benefit may include the ability to provide additional occupant headroom with the elevated packaging location of the sunshade.

Aspects of this disclosure are directed to vehicle sunroof assemblies with enhanced water management systems. For instance, a sunroof assembly is presented that includes a frame assembly that attaches to the body of a motor vehicle, at least partially nested within an aperture that extends through the vehicle's roof structure. A center panel, which may be in the nature of a glass and/or polymeric pane, is movably mounted to the frame assembly. The center panel pivots and/or slides between a closed position, whereat the center panel substantially or completely obstructs the roof aperture, and an open position, whereat the center panel partly or completely exposes the aperture. A drain channel, which is attached to the frame assembly, collects and expels fluids from the sunroof assembly, e.g., through one or more drain tubes. An opaque or semitransparent sunshade is movably mounted to the frame assembly, adjacent the center panel. This sunshade manually or automatically transitions between a deployed position, whereat the sunshade prevents the passage of light through the roof aperture, and a stowed position, whereat the sunshade allows light to pass through the aperture. When in the deployed position, the sunshade is designed to repel water and direct the repelled water into the drain channel. An upper surface of the sunshade, for example, may be coated with a water-repellant material. In addition, lateral sides of the sunshade may abut top ends of the drain channel's sidewalls to allow water to runoff into the channel.

Other aspects of the present disclosure are directed to motor vehicles that are stock equipped or retrofit with a sunroof assembly having a sunshade water drainage backup system. As used herein, the term "motor vehicle" may include any relevant vehicle platform, such as passenger vehicles (internal combustion engine, hybrid electric, full electric, fuel cell electric, fully or partially autonomous, etc.), commercial vehicles, industrial vehicles, tracked vehicles, off-road and all-terrain vehicles (ATV), farm equipment, boats, etc. In the same vein, the term "sunroof" may be defined herein to include any type of sunroof configuration, including pop-up, sliding, folding, etc. A motor vehicle is presented that includes a vehicle body with a passenger compartment fore or aft of an engine compartment, and roof structure extending above and covering the passenger compartment. Multiple road wheels are rotatably attached to the vehicle body and driven, for example, by an engine and/or an electric motor.

Continuing with the above example, the motor vehicle also includes a sunroof assembly with a frame that is mounted directly or indirectly to the vehicle body, at least partially nested within an aperture in the vehicle's roof structure. A transparent or semitransparent center panel is movably mounted to the sunroof frame, operable to selectively transition between closed and open positions to thereby obstruct and expose the aperture in the roof structure. One or more drain channels, which are attached to the frame assembly (e.g., each integrally formed with or mounted adjacent a discrete window guide rail), collect and expel fluids from the sunroof assembly. A sun-light-blocking sunshade is also movably mounted to the frame assembly, generally parallel to and underneath the center panel. The sunshade is operable to selectively transition between deployed and stowed positions to thereby prevent and allow the passage of light through the roof aperture. This sunshade, when placed in the deployed position, repels water and other fluids, and directs the repelled water into the drain channel for evacuation from the sunroof assembly.

Additional aspects of this disclosure are directed to methods for manufacturing and methods for employing any of the herein depicted or described vehicle sunroof assemblies. For instance, a method is presented for assembling a sunroof assembly for a motor vehicle. The representative method includes, in any order and in any combination with any of the disclosed features and options: attaching a frame assembly to the vehicle body at least partially nested within the aperture in the roof structure; mounting, in a movable manner, a center panel to the frame assembly, the center panel being operable to transition between a closed position, whereat the center panel obstructs the aperture, and an open position, whereat the center panel exposes the aperture; attaching a drain channel to the frame assembly, the drain channel being configured to collect and expel fluids from the sunroof assembly; and mounting, in a movable manner, a sunshade to the frame assembly adjacent the center panel, the sunshade being operable to transition between a deployed position, whereat the sunshade prevents passage of light through the aperture, and a stowed position, whereat the sunshade allows the passage of light through the aperture, wherein the sunshade is configured, when in the deployed position, to repel water and direct the repelled water into the drain channel.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and subcombinations of the elements and features presented above and below.

Figure 1:
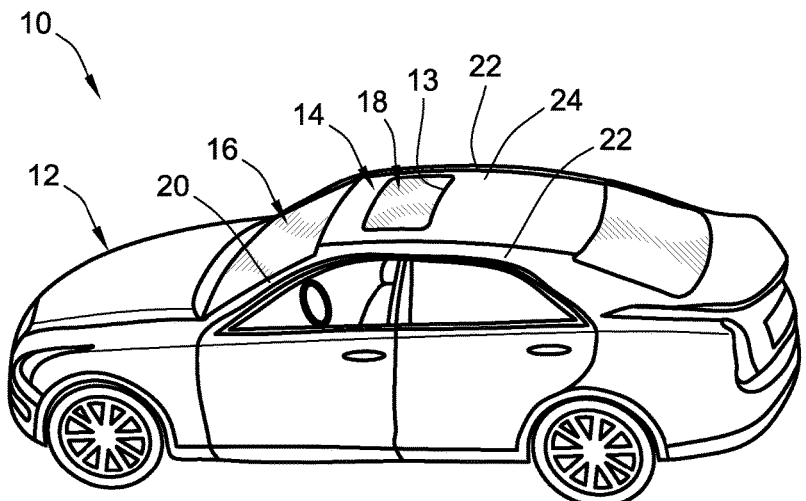
FIG. 1 is an elevated perspective-view illustration of a representative motor vehicle with an example of a sunroof assembly in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., are with respect to a motor vehicle, namely a forward driving direction of a motor vehicle when the vehicle is operatively oriented on a normal driving surface, for example.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door, sedan-style passenger vehicle. Mounted to the vehicle body 12 of the automobile 10, e.g., on a support flange in the vehicle's roof structure 14 over the passenger compartment 16, is a sunroof assembly 18. The illustrated automobile 10—also referred to herein as "motor vehicle" or "vehicle" for short—is merely an exemplary application with which aspects and features of this disclosure may be practiced. In the same vein, implementation of the present concepts into a motorized "tilt-and-slide" type sunroof assembly 18 should also be appreciated as an exemplary application of the novel concepts disclosed herein. As such, it will be understood that aspects and features of the present disclosure may be applied to other sunroofs designs, and implemented for any logically relevant type of motor vehicle. Lastly, the drawings presented herein are not necessarily to scale and are provided purely for instructional purposes. Thus, the specific and relative dimensions shown in the drawings are not to be construed as limiting.

Vehicle 10 of FIG. 1 is erected on a rigid vehicle frame 20, either as a body-on-frame or a unibody construction, with an interior passenger compartment 16 that seats and safeguards the vehicle occupants. A rigid roof structure 14 generally delimits the upper extent of the passenger compartment 16, shielding the driver and passengers from rain, snow and other elements. In accord with the illustrated example, the roof structure 14 is generally composed of laterally spaced roof rails 22 that are interconnected with longitudinally spaced crossmember braces (not visible) that cooperatively provide subjacent support for a roof panel 24. The roof structure 14, including the rails 22, braces, and roof panel 24, extends over and across the upper extent of the passenger compartment 16. Proximate a forward end of the roof structure 14 is an aperture 13 that extends through the roof panel 24. This aperture 13 (also referred to herein as "roof aperture") may be fashioned into the roof structure 14 by hem flanging the roof panel 24 over the edge of an inner roof reinforcement panel (not visible). The sunroof assembly 18 cooperates with the aperture 13 to allow a vehicle occupant to open and close the aperture 13 as desired, e.g., for additional sunlight and ventilation. The size, shape and location of the aperture 13 and, thus, the sunroof assembly 18 may be modified from that shown in the drawings, e.g., to accommodate the different roof designs of other vehicle platforms.

Figure 2:
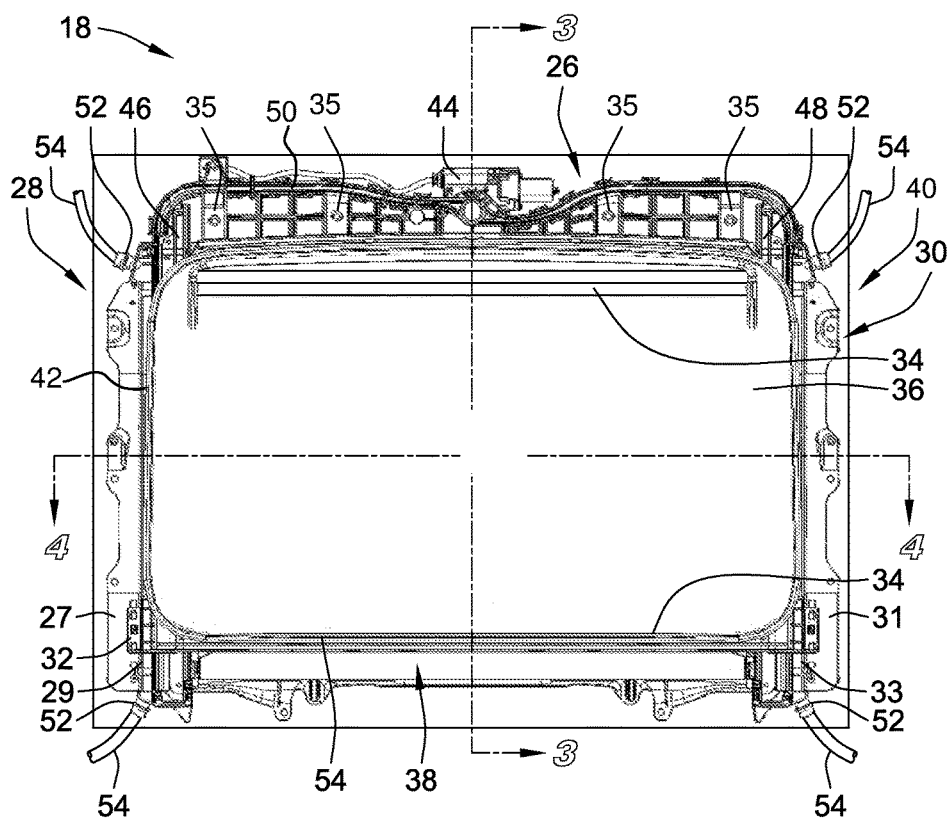
FIG. 2 is a plan-view illustration of the representative sunroof assembly of FIG. 1, shown with the vehicle roof structure removed to better illustrate the constituent parts of the sunroof assembly.

Turning next to FIG. 2, the vehicle sunroof assembly 18 is shown constructed as a unitary module that is generally composed of a forward header 26, a port-side (first) track 28, a starboard-side (second) track 30, a rear crossmember 32, an underside pan 34, a center panel 36, and a sunshade 38. The header 26, tracks 28 and 30, crossmember 32 and pan 34 are joined to one another, e.g., via riveting, welding and/or fasteners, to collectively define a generally rectangular sunroof frame assembly 40. This frame assembly 40 functions to operatively attach the sunroof assembly 18 to the vehicle body 12 such that the center panel 36 and a continuous seal 42 circumscribing the panel 36 are nested within and coterminous with the roof aperture 13. As a non-limiting example, the sunroof frame assembly 40 may be loaded from inside the passenger compartment 16, below the roof rails 22 and crossmember braces, and then raised into contact with the interior of the roof structure 14. Transversely projecting mounting flanges 27, 31 of the tracks 28, 30 are pressed against and fastened via bolts 39 (FIG. 4) to complementary flanges (not shown) of the roof rails 22. Likewise, raised reinforcement ribs 35 of the forward header 26 are pressed against and fastened to the underside surfaces of the roof structure's crossmember braces. Adhesives and foam sealants may be applied for a more secure attachment or to ensure a more fluid-tight seal between the frame assembly 40 and the vehicle roof structure 14. Adhesives and/or sealants may also be applied between the sunroof frame assembly rails and endcaps that interface with drain tubes, which are described below. It is envisioned that alternative means and methods may be employed for installing the sunroof assembly 18.

Center panel 36 of FIG. 2 is operatively mounted onto the sunroof frame assembly 40 such that the center panel 36 is movable relative to the vehicle roof structure 14 and aperture 13. For a motorized "tilt-and-slide" configuration—an example of which is presented in the drawings—the sunroof assembly 18 is equipped with a two-way electric stepper motor 44 that is supported on the forward header 26 and governed by a programmable electronic control unit (ECU) (not shown). The electric stepper motor 44 is operatively connected to the center panel 36, e.g., via left-hand and right-hand drive arms 46 and 48, respectively, and a drive cable 50, to slide the center panel 36 fore and aft (up and down in FIG. 2) as well as raise and lower the center panel 36 (out of and into the page in FIG. 2). Port-side and starboard-side tracks 28, 30, which are generally parallel to each other and the roof rails 22, extend between and connect the forward header 26 to the rear crossmember 32. Integrally formed into each track 28, 30 is a respective guide rail 29 and 33, each of which is located adjacent a respective lateral edge 11 and 15 of the aperture 13 in the roof structure 14. The center panel 36, which may be fabricated from a transparent glass pane, a transparent polymeric sheet, or a laminated glass construction of both, is slidably mounted onto the guide rails 29, 33 via rollers on the drive arms 46, 48. By operating a switch, dial, softkey, or other suitable input device within the passenger compartment 16, a vehicle occupant can activate the stepper motor 44 and thereby selectively transition the center panel 36 from a closed position (FIG. 1), whereat the center panel 36 seats within and substantially or completely obstructs the roof aperture 13, to an open position, whereat the center panel 36 of FIGS. 1 and 2 is slid rearward and/or pivots upward to partly or completely expose the aperture 13, and vice versa. Alternative configurations may employ substitute means for moving the center panel, including pneumatic actuators, hydraulic actuators, and manual mechanisms.

With continuing reference to the representative architecture of FIG. 2, the frame assembly 40 is equipped with a water management system for regulating and evacuating fluid from the vehicle sunroof assembly 18. For instance, one or more fluid conduits, such as drain channel segments 60 and 62 of FIG. 3, as well as drain channel segments 64 and 66 of FIG. 4, may be mounted on, integrally formed with, or otherwise attached to the frame assembly 40 to collect, e.g., rain water, melting or melted snow, soapy car wash water, etc., and expel the collected liquids from the sunroof assembly 18 through a series of bleed nozzles 52 and drain hoses 54. According to the illustrated example, two lateral drain channel segments 64, 66 (also referred to herein as "first and second channel segments" for brevity; best seen in FIG. 4) extend in a continuous manner along the fore-aft lengths of the tracks 28, 30, positioned below respective lateral edges 11, 15 of the roof aperture 13. As can be seen in FIG. 4, each channel segment 64, 66 may be integrally formed with a corresponding guide rail 29, 33 and, thus, may be oriented substantially parallel with each other as well as with the rails 29, 33 and the lateral edges of the center panel 36. Each channel segment 64, 66 is shown with a U-shaped construction that is formed with a pair of laterally spaced, generally parallel sidewalls 65, the bottoms ends of which are interconnected with a base 67 that extends between and is generally orthogonal to the sidewalls 65. A horizontal flange 69 is integrally formed with and projects inboard from the top end of the innermost sidewall 65 of each channel segment 64, 66.

To manage water runoff at forward and rearward ends of the sunroof assembly 18, the sunroof water management system may employ a forward drain channel segment 60 that is attached to the forward header 26 and, optionally, integrated into a pull cup or handle 74. A rearward drain channel segment 62 may be attached to the frame assembly 40 underneath the rear crossmember 32 and sunshade 38. By way of non-limiting example, the forward drain channel segment 60 (or "third channel segment") may be fabricated as a U-shaped trough that is integrally formed into the top surface of the forward header 26, positioned directly underneath the forward-most (fore) edge 17 of the aperture 13. A portion of the forward drain channel segment 60 may be integrated into the handle 74 of the sunshade 38. Rearward drain channel segment 62 (or fourth "channel segment") is shown fabricated as a cup-shaped trough with a serpentine-like transverse cross-section. This channel segment 62 may be positioned underneath the rearward-most (aft) edge 19 of the roof aperture 13, partially surrounding a roller mechanism 70 of the sunshade 38. The first, second, third and fourth drain channel segments 60, 62, 64 and 66 may be fluidly interconnected, e.g., at intersecting ends thereof proximate the various bleed nozzles 52, to form a substantially continuous drain channel that extends around the perimeter of the frame assembly 40. It is envisioned that any or all of the drain channel segments 60, 62, 64 and 66 may take on different orientations, locations, and/or structural configurations from that which are shown in the drawings. Moreover, while shown as individual sections that are fluidly connected to form a single, continuous drain channel, it is within the scope of this disclosure to integrally form one or more or all of the channel segments 60, 62, 64 and 66 as a single-piece structure. Optionally, one or more of the channel segments 60, 62, 64 and 66 may be eliminated and/or replaced with alternative structure that diverts fluid into discrete drain channels.

Figure 3:
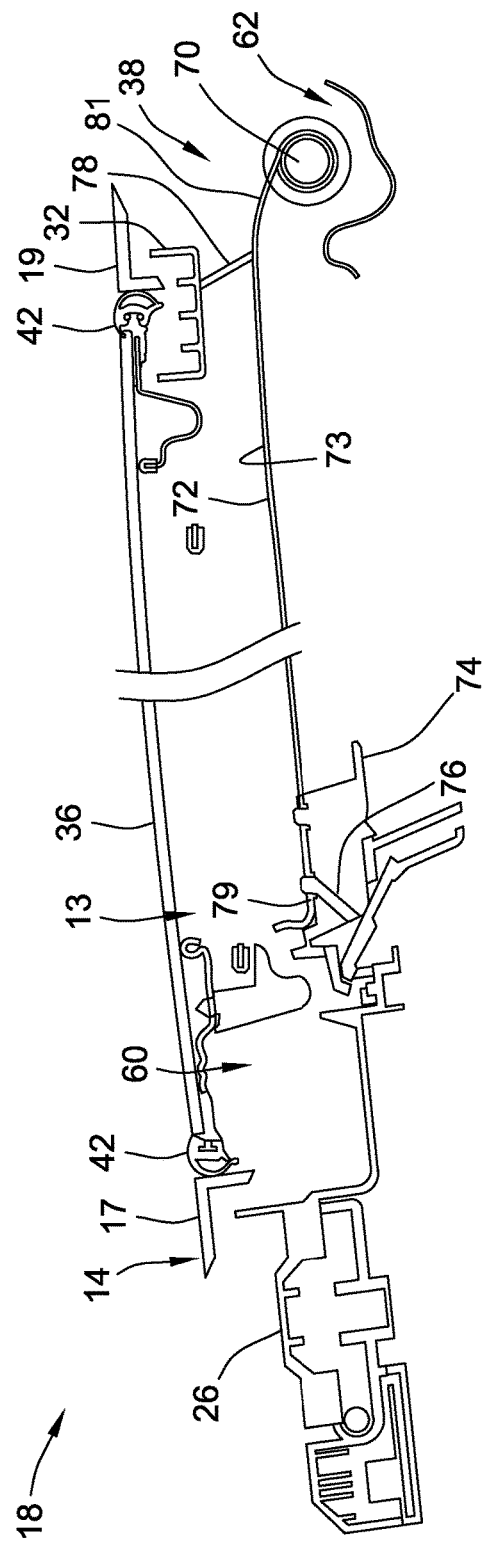
FIG. 3 is a cross-sectional, side-view illustration of fore and aft segments of the representative sunroof assembly of FIG. 1 taken along line 3-3 of FIG. 2.
Figure 4:
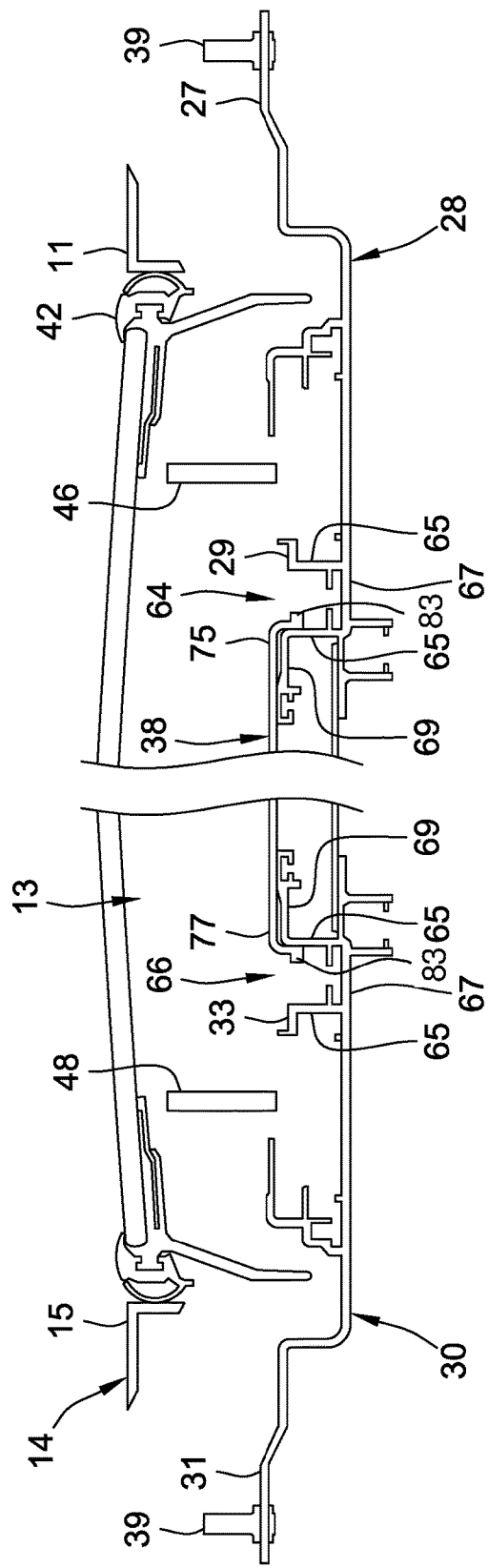
FIG. 4 is a cross-sectional, rearward-view illustration of port and starboard segments of the representative sunroof assembly of FIG. 1 taken along line 4-4 of FIG. 2.

With collective reference now to both FIGS. 3 and 4, the sunroof assembly 18 is furnished with a sunshade 38 that may be manually or electronically operated to selectively prohibit light from entering the passenger compartment 16 (FIG. 1) through the aperture 13 in the roof panel 24. Put another way, the sunshade 38 may be drawn across the aperture 13 from inside of the passenger compartment 16 such that the sunshade blocks from the sight center panel 36. Conversely, the sunshade 38 may be pulled open, e.g., under the force of a return spring (not visible) or an electric motor, to thereby unblock the aperture 13 and center panel 36 such that an occupant may see out of the of the passenger compartment 16 and, concomitantly, light can enter through the aperture 13. In accord with the illustrated example, the sunshade 38 is a "roll-up" or "roller" type sunshade with an opaque blind 72 that is attached to a spring-biased roller mechanism 70 (FIG. 3). The blind 72, which may be embodied as a vinyl sheet or other suitable textile material, is movably mounted to the frame assembly 40 via the roller mechanism 70, positioned directly underneath the center panel 36 (when both are closed). The blind 72 segment of the sunshade 38 may be pulled, pushed or otherwise drawn closed to a deployed position (FIG. 4), and thereby substantially or completely prevent light from entering through the aperture 13. Conversely, the blind 72 may be slid open, e.g., under the pull force of a return spring or motor, to a stowed position such that light is allowed to pass through the aperture 13. The sunshade 38 can take on any suitable configuration, including roller type sunshades, as shown, and other available designs, including sliding screen, Roman, etc.

When deployed, the sunshade 38 is designed to repel liquids and direct the repelled liquids into one or more of the drain channel segments 60, 62, 64, 66 such that the liquid can be evacuated from the vehicle sunroof assembly 18, e.g., through the bleed nozzles 52 and drain hoses 54. In so doing, the sunshade 38 may function as a "backup" water management system that helps to prevent or otherwise mitigate incidental water ingress and attendant water damage that may occur while the center panel 36 is open and the sunshade 38 is deployed. As one option, an upper or topmost surface 73 (FIG. 3) of the sunshade blind 72 may be coated with a suitable water-repellant material (e.g., alkyl-based surfactants) or modified with a hydrophobic surface treatment (e.g., cold plasma treatment) to prevent the blind 72 from absorbing liquids and, at the same time, force the liquids off of the sunshade 38. Another option includes the blind 72 segment of the sunshade 38 taking on a convex-up shape relative to the roof structure 14 of the motor vehicle 10, as portrayed in FIG. 4. For instance, the blind 72 may be fabricated with an internal skeletal structure or a exoskeletal backing composed of arc-shaped metallic leaf springs or smart-material based ribs (e.g., electroactive polymers) that flex when the blind 72 is moved to the deployed position such that the upper surface 73 rounds and points away from the passenger compartment 16 (e.g., points upwards in FIG. 4).

Liquids that land on the sunshade 38 may be routed into one or more of the drain channel segments 60, 62, 64 and 66 by positioning the sunshade blind 72 along the uppermost extent of each available channel segment 60, 62, 64, 66 when the sunshade 38 is deployed. This will allow liquids that fall onto the upper surface 73 to naturally flow off of the leading, trailing and/or lateral sides of the blind 72, e.g., under the force of gravity, into the forward, rearward and/or lateral drain channel segments 60, 62, 64, 66. The terms "leading" and "trailing," as used herein with reference to the sunshade assembly 38, may be defined to reference the foremost edge or portion and the rearmost edge or portion, respectively, of the sunshade blind 72 relative to the blind's direction of travel when the sunshade 38 transitions from the stowed to the deployed position. Turning again to FIG. 4, opposing first and second lateral sides 75 and 77, respectively, of the sunshade blind 72 slide across and abut a top end of the inner most sidewall of the first and second channel segments 64, 66, respectively. Optionally, the first and second lateral sides 75, 77 of the sunshade blind 72 are shown extending across and wrapping around the flange 69 and the top end of the inboard sidewall 65 of their respective channel segments 64, 66. This will provide a smoother transition for guiding water runoff from the blind 72 into the first and second channel segments 64, 66. An optional bead or dovetail slide 83 may be formed in or attached to each lateral side 75, 77 and mated with a complementary slot in the inboard sidewall 65 to thereby retain the blind 72 in constant contact with the channel segments 64, 66. In the same regard, when the sunshade 38 is deployed, leading and trailing edges 79 and 81, respectively, of the sunshade blind 72 are shown positioned above the forward and rearward drain channel segments 60, 62, as seen in FIG. 3.

The vehicle sunroof assembly 18 may also incorporate additional features for helping to direct liquids from the sunshade blind 72 into the drain channel segment(s). One optional feature includes a pull cup or handle 74 that is mounted proximate the leading edge 79 of the blind 72, and is configured to provide ergonomic gripping hardware for manually opening and closing the sunshade 38. This pull cup/handle 74 is fabricated with a drain passage 76 (also referred to herein as "transverse drain passage") that receives water from the upper surface 73 of the blind 72, and directs the received water into one or more of the drain channel segments 64, 66. To assist with draining water from the leading edge 79 of the sunshade 38, the blind 72 may be angled with respect to the roof structure 14, as shown in FIG. 3, such that the leading edge 79 is lower than the trailing edge 81, e.g., whereby water is directed towards the drain passage 76 in the pull cup/handle 74. For at least some embodiments, this drain passage 76 extends transversely along the leading edge 79 to opposite edges at both lateral sides 75, 77 of the sunshade blind 72. As another optional feature, a fluid dam or wiper blade 78 may be mounted, e.g., to the rear crossmember 32 or other suitable structure, proximate the trailing edge 81 of the blind 72. This fluid dam/wiper blade 78 is shaped and positioned to redirect water from the upper surface 73 of the sunshade blind 72 into one or more of the drain channel segments 64, 66.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and recognizable variations apparent from the foregoing descriptions are within the scope of the disclosure as defined by the appended claims. Moreover, the present concepts expressly include any and all combinations and subcombinations of the preceding elements and features.

What is claimed:

1. A sunroof assembly for a motor vehicle, the motor vehicle including a vehicle body with a roof structure defining therethrough an aperture, the sunroof assembly comprising:
   a frame assembly configured to attach to the vehicle body and at least partially position within the aperture in the roof structure;
   a center panel movably mounted to the frame assembly and operable to transition between closed and open positions to thereby obstruct and expose the aperture, respectively;
   a drain channel attached to the frame assembly and configured to collect and expel fluids from the sunroof assembly; and
   a sunshade movably mounted to the frame assembly adjacent the center panel, the sunshade including an opaque blind attached to a roller mechanism and operable to transition between deployed and stowed positions to thereby block and allow passage of light through the aperture, respectively, wherein the sunshade is configured, when in the deployed position, to repel water and direct the repelled water into the drain channel.

2. The sunroof assembly of claim 1, wherein the drain channel includes opposite facing sidewalls and a base connecting bottom ends of the sidewalls, and wherein a lateral side of the sunshade is configured to abut a top end of one of the sidewalls.

3. The sunroof assembly of claim 2, wherein the drain channel further includes a flange projecting inboard from the top end of the one of the sidewalls, and wherein the lateral side of the sunshade wraps around the flange and the top end of the one of the sidewalls.

4. The sunroof assembly of claim 2, wherein the aperture has opposing fore and aft edges and opposing first and second lateral edges connecting the fore and aft edges, wherein the drain channel includes first and second channel segments extending along the first and second lateral edges, respectively, and wherein the sunshade includes opposing first and second lateral sides configured to abut top ends of first and second channel segments, respectively.

5. The sunroof assembly of claim 1, wherein the sunshade is configured to take on a convex-up shape relative to the roof structure of the motor vehicle.

6. The sunroof assembly of claim 1, wherein an upper surface of the sunshade is coated with a water-repellant material or includes a hydrophobic surface treatment.

7. A sunroof assembly for a motor vehicle, the motor vehicle including a vehicle body with a roof structure defining therethrough an aperture, the sunroof assembly comprising:
   a frame assembly configured to attach to the vehicle body and at least partially position within the aperture in the roof structure;
   a center panel movably mounted to the frame assembly and operable to transition between closed and open positions to thereby obstruct and expose the aperture, respectively;
   a drain channel attached to the frame assembly and configured to collect and expel fluids from the sunroof assembly; and
   a sunshade movably mounted to the frame assembly adjacent the center panel and operable to transition between deployed and stowed positions to thereby block and allow passage of light through the aperture, respectively, wherein the sunshade is configured, when in the deployed position, to repel water and direct the repelled water into the drain channel, wherein the sunshade has opposing leading and trailing edges and a pull cup mounted proximate the leading edge, the pull cup including a drain passage configured to direct water to the drain channel.

8. The sunroof assembly of claim 7, wherein the sunshade, when in the deployed position, is angled with respect to the roof structure such that the leading edge is lower than the trailing edge whereby water is directed towards the drain passage in the pull cup.

9. The sunroof assembly of claim 7, wherein the drain passage extends transversely along the leading edge to both opposing lateral sides of the sunshade.

10. The sunroof assembly of claim 1, wherein the sunshade has opposing leading and trailing edges and a fluid dam mounted proximate the trailing edge, the fluid dam being configured to direct water to the drain channel.

11. The sunroof assembly of claim 1, wherein the frame assembly includes first and second guide rails mounted adjacent first and second lateral edges of the aperture in the roof structure, the center panel being slidably mounted onto the first and second guide rails.

12. The sunroof assembly of claim 7, wherein the sunshade includes an opaque blind attached to a roller mechanism.

13. The sunroof assembly of claim 1, wherein the center panel includes a transparent glass panel and/or a transparent polymeric panel.

14. A method of assembling a sunroof assembly for a motor vehicle, the motor vehicle including a vehicle body with a roof structure defining therethrough an aperture, the method comprising:
   attaching a frame assembly to the vehicle body such that the frame assembly is at least partially positioned within the aperture in the roof structure;
   mounting, in a movable manner, a center panel to the frame assembly, the center panel being operable to transition between a closed position, whereat the center panel obstructs the aperture, and an open position, whereat the center panel exposes the aperture;
   attaching a drain channel to the frame assembly, the drain channel being configured to collect and expel fluids from the sunroof assembly; and
   mounting, in a movable manner, a sunshade to the frame assembly adjacent the center panel, the sunshade including an opaque blind attached to a roller mechanism and operable to transition between a deployed position, whereat the sunshade blocks passage of light through the aperture, and a stowed position, whereat the sunshade allows the passage of light through the aperture,
   wherein the sunshade is configured, when in the deployed position, to repel water and direct the repelled water into the drain channel.

15. A motor vehicle comprising:
   a vehicle body including a passenger compartment and roof structure above the passenger compartment, the roof structure defining therethrough an aperture;
   a plurality of road wheels rotatably attached to the vehicle body; and
   a sunroof assembly comprising:
      a frame assembly attached to the vehicle body;
      a center panel movably mounted to the frame assembly and operable to transition between closed and open positions to thereby obstruct and expose the aperture in the roof structure, respectively;

a drain channel attached to the frame assembly and configured to collect and expel fluids from the sunroof assembly; and a sunshade movably mounted to the frame assembly underneath the center panel, the sunshade including an opaque blind attached to a roller mechanism and operable to transition between deployed and stowed positions to thereby block and allow passage of light through the aperture, respectively, wherein the sunshade is configured, when in the deployed position, to repel water and direct the repelled water into the drain channel.

16. The motor vehicle of claim 15, wherein the drain channel includes a pair of opposite facing sidewalls and a base connecting bottom ends of the sidewalls, and wherein a lateral side of the sunshade is configured to abut a top end of one of the sidewalls.

17. The motor vehicle of claim 16, wherein the drain channel further includes a flange projecting inboard from the top end of the one of the sidewalls, and wherein the lateral side of the sunshade wraps around the flange and the top end of the one of the sidewalls.

18. The motor vehicle of claim 15, wherein an upper surface of the sunshade is coated with a water-repellant material or includes a hydrophobic surface treatment.

19. The motor vehicle of claim 15, wherein the sunshade has opposing leading and trailing edges and a pull cup mounted proximate the leading edge, the pull cup including a drain passage configured to direct water to the drain channel.

20. The motor vehicle of claim 15, wherein the sunshade has opposing leading and trailing edges and a fluid dam mounted proximate the trailing edge, the fluid dam being configured to direct water to the drain channel.

* * * * *